United States Patent
Rado

(10) Patent No.: US 7,916,023 B2
(45) Date of Patent: Mar. 29, 2011

(54) SYSTEM AND METHOD FOR TRACKING ASSETS WITHIN A MONITORED ENVIRONMENT

(75) Inventor: Rodrigo Rado, Sunnyvale, CA (US)

(73) Assignee: Zebra Enterprise Solutions Corp., Oakland, CA (US)

( * ) Notice: Subject to any disclaimer, the term of this patent is extended or adjusted under 35 U.S.C. 154(b) by 803 days.

(21) Appl. No.: 11/624,848

(22) Filed: Jan. 19, 2007

(65) Prior Publication Data

US 2007/0182556 A1 Aug. 9, 2007

Related U.S. Application Data

(60) Provisional application No. 60/763,839, filed on Jan. 31, 2006.

(51) Int. Cl.
*G08B 13/14* (2006.01)
(52) U.S. Cl. ........... 340/572.1; 340/571; 340/539.13; 340/539.26; 700/115; 700/213; 414/803
(58) Field of Classification Search ............. 340/571, 340/572.1, 539.13, 539.1, 679, 686.1, 539.26; 414/139.4, 803; 700/115, 116, 213, 215
See application file for complete search history.

(56) References Cited

U.S. PATENT DOCUMENTS

| | | | | |
|---|---|---|---|---|
| 5,604,715 | A | 2/1997 | Aman et al. | 367/118 |
| 5,920,287 | A * | 7/1999 | Belcher et al. | 342/450 |
| 5,995,046 | A | 11/1999 | Belcher et al. | 342/450 |
| 6,026,378 | A | 2/2000 | Onozaki | 705/28 |
| 6,121,926 | A | 9/2000 | Belcher et al. | 342/450 |
| 6,127,976 | A | 10/2000 | Boyd et al. | 342/463 |
| 6,317,082 | B1 | 11/2001 | Bacon et al. | 342/465 |
| 6,356,802 | B1 | 3/2002 | Takehara et al. | 700/215 |
| 6,380,894 | B1 | 4/2002 | Boyd et al. | 342/450 |
| 6,427,913 | B1 * | 8/2002 | Maloney | 235/383 |
| 6,434,194 | B1 | 8/2002 | Eisenberg et al. | 375/238 |
| 6,502,005 | B1 | 12/2002 | Wrubel et al. | 700/116 |
| 6,577,921 | B1 | 6/2003 | Carson | 700/214 |
| 6,593,885 | B2 | 7/2003 | Wisherd et al. | 342/463 |
| 6,655,582 | B2 | 12/2003 | Wohl et al. | 235/380 |
| 6,657,586 | B2 | 12/2003 | Turner | 342/357.07 |
| 6,665,585 | B2 | 12/2003 | Kawase | 700/226 |
| 6,812,839 | B1 | 11/2004 | Belcher et al. | 340/572.1 |
| 6,853,687 | B2 | 2/2005 | Harrington et al. | 375/259 |
| 6,859,485 | B2 | 2/2005 | Belcher | 375/130 |
| 6,892,054 | B2 | 5/2005 | Belcher et al. | 455/63.1 |

(Continued)

OTHER PUBLICATIONS

Molisch et al., "*MIMO Systems With Antenna Selection—An Overview*," Mar. 2004, pp. 1-18.
"*Position Tracking Interface Unit (PTIU) for RTG's*," Paceco Corp., 2003, www.pacecocorp.com, pp. 1-6.
"Wherenet Introduces Wireless Locations Solution for Marine Terminals," Online, Oct. 21, 2003, www.wherenet.com/pressreleases/pr_10212003.html, 2 pages.

(Continued)

*Primary Examiner* — Daniel Wu
*Assistant Examiner* — Nay Tun
(74) *Attorney, Agent, or Firm* — Alston & Bird LLP

(57) ABSTRACT

A system associates change in the state of an asset to an event trigger within a monitored environment. This environment includes a plurality of assets and a tag transmitter positioned on each asset and operative for transmitting a wireless RF signal based on an event trigger based on one of at least the change in state of an asset and change in location of the asset. A plurality of spaced apart access points receive an RF signal transmitted from a tag transmitter. A processor is operatively connected to the access points and collect possible candidates as assets associated with the event trigger and assigning a numerical score to each candidate to determine which asset is best associated with the event trigger.

27 Claims, 6 Drawing Sheets

U.S. PATENT DOCUMENTS

| | | | |
|---|---|---|---|
| 7,012,529 B2 * | 3/2006 | Sajkowsky | 340/572.1 |
| 7,148,803 B2 * | 12/2006 | Bandy et al. | 340/539.16 |
| 2002/1007089 | 6/2002 | Huston et al. | 342/357.09 |
| 2002/0181565 A1 | 12/2002 | Boyd et al. | 375/152 |
| 2003/0137968 A1 | 7/2003 | Lareau et al. | 370/349 |
| 2003/0191555 A1 | 10/2003 | Takehara et al. | 700/215 |
| 2003/0216969 A1 * | 11/2003 | Bauer et al. | 705/22 |
| 2004/1010287 | 5/2004 | Andersen et al. | 700/215 |
| 2004/0249557 A1 | 12/2004 | Harrington et al. | 701/115 |
| 2006/0220851 A1 | 10/2006 | Wisherd | 340/568.1 |
| 2007/0214055 A1 * | 9/2007 | Temko | 705/22 |
| 2007/0268138 A1 * | 11/2007 | Chung et al. | 340/572.1 |

OTHER PUBLICATIONS

"Dockside Cranes Get Brains," RFID Journal, Online, Oct. 29, 2003, www.rfidjournal.com/article/articleview/630/1/17, 2 pages.

"WhereLan," Online, 2003, www.wherenet.com/pdfs/wherelan%204.9.04.pdf, 1 page.

"WhereTag III," Online, 2003, www.wherenet.com/pdfs/wheretag%20III.5.3.0.pdf, 1 page.

"WherePort III," Online, 2003, www.wherenet.com/pdfs/whereport.10.1.0.pdf, 2 pages.

* cited by examiner

SYSTEM AND METHOD FOR TRACKING ASSETS WITHIN A MONITORED ENVIRONMENT

RELATED APPLICATION

This application is based upon prior filed provisional application Ser. No. 60/763,839 filed Jan. 31, 2006.

FIELD OF THE INVENTION

This invention relates to real-time location systems (RTLS), and more particularly, this invention relates to real-time location systems for tracking cargo containers and similar assets, including vehicles.

BACKGROUND OF THE INVENTION

A real-time location system can be used for tracking containers in modern marine terminals, tracking vehicles at rental car agencies and similar venues, tracking inventory in a warehouse or tracking other assets. Examples of such real-time location systems and methods are disclosed in commonly assigned U.S. Pat. Nos. 5,920,287; 5,995,046; 6,121,926; 6,127,976; 6,657,586; 6,812,839; and U.S. Published Patent Application Nos. 2002/0181565 and 2006/0220851, the disclosures which are hereby incorporated by reference in their entirety.

In one type of location system, for example, at a marine terminal or rental car agency, challenges are presented because of the many sources of information. For example, telemetry location could come from the location system. Other information could come from external events, e.g., a customer, including messages. From these disparate sources of information, it is desirable to determine what events occur at the marine terminal or other venue. It is desirable to have these different windows into events, especially when information is inconsistent. As information is added, it becomes increasingly difficult to construct the logic to determine an asset location. Previous systems typically used numerous if-else logic statements in code. As information was received, it was difficult to determine how to incorporate the additional information into an algorithm.

If-else rules are typically conditional statements and complicated. If-else rules define operations to be carried out if none of any specifically described conditions occur. There could be many different actions to be performed depending on the result of tests or data that has been received, making complicated if-else logic statements. This type of system and code can become complicated.

It would be more desirable if a rule or "squaring" approach could be used because of the complexity involved in these location systems. For example, in a marine terminal, there are cranes that pick containers off a ship and drop them into a truck or onto a railcar. It is desirable to determine what truck or railcar the cargo container was positioned. The location system by itself could be accurate to a foot and that would be enough to determine which truck a cargo container was positioned. Unfortunately, the location system is not always accurate because of different factors whether environmental or technical. There may be several trucks within a certain radius and it is desirable if the system could narrow down on which one of the trucks the container had been placed. There could also be telemetry from the trucks. For example, sensor data could be admitted, telling the system that a container was detected such as by an ultrasonic sensor on a container or loader. These different sources of information are a challenge.

Also, a sensor could break, making the if-else rules difficult. The data could also be inconsistent. Other sensors such as a moving/not-moving sensor could be broken on a utility tractor rig (UTR), which may have been stopped. Because the sensor was not working, the UTR would appear to be moving, for example. It would be desirable if a real-time location system could be implemented that would not rule out certain factors for consideration because a UTR was considered to be moving. For this reason, a weighted rule system is desirable, which could be increasingly important in a complicated modern marine terminal, rail terminal, or rental car venue.

For example, the modern marine terminal must efficiently process an increasing number of containers in an area of limited space with little, if any, land available for expansion. Capacity demands are increasing rapidly with higher volumes of container traffic worldwide and new, larger container ships coming on-line. Specific containers should be located on demand among the thousands of containers at any given time, but this can be difficult if there is a lack of an accurate and real-time container identification and tracking system of drayage tractors, switched tractors, wheeled container chassis, top and side pick loaders, and gantry and quay cranes. Locating a container can also be complicated by the number of ways in which containers can be processed through a terminal. For example, some containers arrive via a vessel or train and are driven through a check-in gate by an outside truck. Once a container enters the terminal, it can be parked on a chassis or cart in a terminal, or removed from the chassis and placed on top a stack of shipping containers. When a container is to be retrieved, it must be located among the thousands of containers in the terminal. These containers may be moved around the terminal by outside drivers, or moved by marine terminal drivers, using a client's tractor with terminal equipment.

Maintaining inventory and track of every container in the terminal is difficult and the large number of containers and the different ways in which the containers can be moved throughout the terminal makes it difficult to locate a specific container when it is needed. Also, the marine terminal often does not run smoothly and this complicates the location system.

Different systems are used for processing containers through a marine terminal, such as discharging a container from a vessel to chassis. For example, containers may arrive in a marine terminal via a vessel or rail. Other containers can be discharged from a vessel to ground. When containers arrive at a marine terminal via a vessel or train, they can be "discharged" or placed on a cart to be stacked, instead of parked on a chassis. Other containers can be checked in at a gate. Instead of arriving via a vessel or train, a container may arrive via a central check-in gate. Drivers employed by customers of the marine terminal arrive at the gate for check-in, where they pass through a gate much like a highway toll plaza. At this gate, information is collected about the container, after which the driver is instructed either to park the chassis and container in a particular location or to discharge the container to ground.

These different systems for processing containers make it difficult to track the containers in a marine terminal. Tracking container movement throughout the marine terminal is important because searching for any misplaced containers requires time and labor costs and adds to the shipping time of goods.

SUMMARY OF THE INVENTION

A system associates change in state of an asset to an event trigger within a monitored environment. This environment includes a plurality of assets and a tag transmitter positioned on each asset and operative for transmitting a wireless RF signal based on an event trigger concerning one of at least the change in state of an asset and change in the location of the asset. A plurality of spaced apart access points receive an RF signal transmitted from a tag transmitter. A processor is operatively connected to the access points and collect possible candidates associated with the event trigger and assign a numerical score to each candidate to determine which asset is best associated with the event trigger.

The access points are typically positioned at known locations within the monitored environment. At least one sensor can be positioned within the environment and operative with the tag transmitter for sensing an event related to change in state of an asset and transmitting data to one of at least a tag transmitter and access point. An interrogator can be positioned within the monitored environment and operative for interrogating a tag transmitter to begin transmission.

In one aspect, the monitored environment can be a rental car lot. In another aspect, the monitored environment can be a cargo container terminal. The monitored environment can also be a marine terminal.

The processor can be operative for geolocating a tag transmitter. It can correlate a signal as a first-to-arrive signal and conduct differentiation of first-to-arrive signals. The processor can be operative for reporting the candidate associate with an event trigger when its numerical score is above a predetermined minimum numerical score. The processor is operative for reporting the candidate when the event trigger has the highest numerical score. It is possible to wait a predetermined time if the numerical score is not above a minimum numerical score and report the candidate associated with the specific event trigger having the best numerical score below the minimum numerical score.

A method aspect is also set forth.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION OF THE PREFERRED EMBODIMENTS

Figure 1:
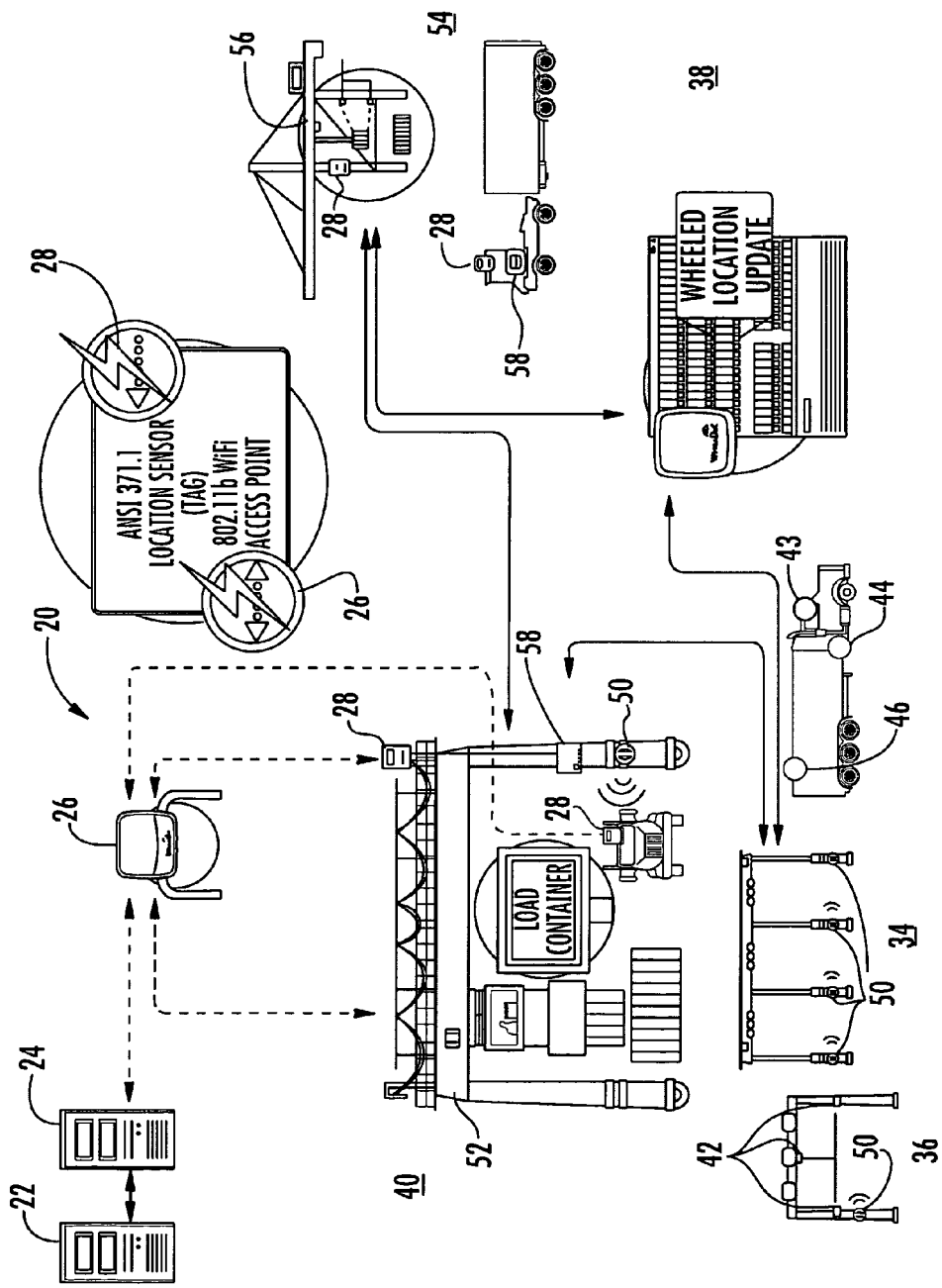
FIG. 1 is a fragmentary, environmental view of a real-time location system for locating containers in a marine terminal that can be used in accordance with one non-limiting example of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In one non-limiting example, an event trigger is generated by a mobile asset or from a fixed location to indicate the gain or loss of another asset. The system and method uses a location optimization algorithm to determine that the asset transaction associated with the event has been triggered to act at the highest accuracy. For example, a loader retrieving a container among a large inventory, or a rental car lot exit lane detecting the presence of a vehicle are areas in which the system and method could be used. This system and method can determine data from relevant, real-time tracked assets to determine a correct association. Each candidate is scored for how well it matches an event and given a weight.

Thus, rules can be written to be consistent with data. Data can be looked at, for example, a candidate truck or rental car as an asset. Each piece of information can be looked at and a rule written for that piece of information, for example, a proximity rule or similar rules. This can be accomplished for each candidate, and the candidate with the highest score would be the one chosen by the system. Thus, there could be some inconsistent data and proper choices can be made.

The system and method can use a real-time location system for real-time container and other asset tracking. It is especially adapted for use in marine terminals, which have stacks of grounded containers, a rental car agency where vehicles must be tracked, and similar venues or locations where much data is received and must be processed. In a marine terminal, rental car agency, and similar systems, the system and method uses low-power radio transmissions to determine the location of radio emission beacons, called tags or tag transmitters, attached to objects such as an incoming trailer pulling containers on a chassis, a utility tractor rig (UTR), a transfer crane (transtainer) for loading flat containers, a drayage tractor, or top pick spreader (also termed a top pick or top handler), sometimes referred collectively as container handling equipment (CHE). The system receives signals from other sources such as other motion and force sensors, a compass for bearing, and other sensors.

The tags transmit radio signals to a fixed array of antennas in a surrounding environment. These are typically located at spaced-apart, different locations, and include receivers and sometimes transmitters and form at each location a Locating Access Point (LAP) or access point, also referred to as tag signal readers, which receive the wireless RF signals, including an ID of the tag, from the wireless transmitter contained in a tag. Each LAP is connected to a processor or server by a wireless or wired LAN. The processor determines location of each tag using technology similar to GPS. Each LAP can include a GPS sensor for adding accuracy to the real-time location system or provide a stand-alone solution in some instances. Important operational advantages are achieved by tracking the location of container handling equipment as it engages/disengages from a container. The system and method also can track gate moves using a compact tag and provide real-time visibility to the container movements within the terminal.

A real-time location system and method that can be modified for use in the system and method of the present application is described in commonly assigned U.S. Pat. No. 6,657, 586 and U.S. Published Patent Application Nos. 2002/ 0181565 and 2006/0220851, the disclosures which are hereby incorporated by reference in their entirety. Similar, commonly assigned patents include U.S. Pat. Nos. 5,920,287; 5,995,046; 6,121,926; and 6,127,976, the disclosures which are hereby incorporated by reference in their entirety.

As noted in the '586 patent, GPS can be used with a tag signal reader or locating access point for adding accuracy. Also, a port device (either separate or part of a locating access point) can include circuitry operative to generate a rotating magnetic or similar electromagnetic or other field such that the port device is operative as a proximity communication device that can trigger a tag to transmit an alternate (blink) pattern. The port device acts as an interrogator, and can be termed such. Such an interrogator is described in commonly assigned U.S. Pat. No. 6,812,839, the disclosure which is incorporated by reference in its entirety. When a tag passes through a port device field, the tag can initiate a pre-programmed and typically faster blink rate to allow more location points for tracking a tagged asset, such as a vehicle hauling a container as it passes through a critical threshold, for example, a shipping/receiving backdoor or gate entry to a marine terminal. Such tags, port devices, and Locating Access Points are commonly sold under the trade designation WhereTag, WherePort and WhereLan by Wherenet USA headquartered in Santa Clara, Calif.

A system and method for tracking containers in a marine terminal is first described, followed by a more detailed explanation of the system and method that uses a location optimization algorithm.

The real-time location system can provide one wireless infrastructure for all tagged assets such as containers, wheeled chassis, tractors, loaders, cranes, maintenance equipment, and other similar container handling equipment. The real-time location system provides real-time ID and location of every tag, and provides reliable telemetry to record transactions, and provides mobile communications to work instruction and data entry terminals. Any terminal operating (management) software (TOS) can be optimized by real-time location and telemetry data to provide real-time, exact-slot accuracy of container ID and location, and real-time location and automatic telemetry of container transactions and container handling equipment and other mobile assets. The real-time location system is applicable for basic container storage as stacked containers (grounded) and parked containers on a chassis (wheeled).

FIG. 1 is a fragmentary environmental view of a real-time location system 20 for locating containers in a marine terminal and showing various applications of this real-time location system 20. A computer server 22 is operative with a terminal operating system (TOS) 24. The server 22 and terminal operating system 24 provide a visibility software suite and marine module with a bidirectional terminal operating system interface that is operative with various locating access points 26. The server 22 also provides processing for receiving data signals from the locating access points 26, which had received wireless signals from tags 28. The server 22 in this example can be operative as a location processor for determining which tagged signals are first-to-arrive signals and conduct differentiation of first-to-arrive signals relative to the location of locating access points as determined by any global positioning system (if used) in order to locate a tag 28, such as positioned on vehicle handling equipment.

As shown, a locating access point can be operative as an access point 26 with WIFI 802.11b Standards and the tag 28 as a location sensor can use ANSI 371.1 Standards that incorporates communication standards for a 2.4 GHz air interface. The gate 34 could be operative with an Optical Character Recognition (OCR) terminal 36. A tag 28 is positioned at the gate to improve OCR transactions and track containers to wheeled 38 and grounded 40 positions. The OCR terminal 36 includes different OCR cameras 42. The tag placement options are shown as on a draymen's truck 43, trailer chassis 44 or container 46. At the grounded position 40, a port device 50 is shown positioned on the illustrated crane 52. The tag updates of a wheeled container in the wheeled position 78 could be operative such that no mobile inventory vehicle, magnet or clerk update is required. The server 22 and TOS 24 could also provide a user interface for a wheeled location update as illustrated.

In a vessel position 54, a tag 28 could be located with an OCR camera 42 for vessel unloading at a maritime crane 56. It should be understood that the tags can be used to upload maintenance and other information from the vehicle, such as hours of operation and fuel levels.

A telemetry unit, such as a VCOM unit or other position tracking interface unit (PTIU) 58, can transmit sensor data through the tag 28 and can report to the real-time location system 20 when a chassis/container is disconnected from a tractor, such as when the driver parks the chassis/container or other similar events. The PTIU 58 can report to the real-time location system 20 when a chassis/container is disconnected from a tractor, such as when the driver parks the chassis/container. The PTIU or other telemetry unit can transmit data from different sensors on the tractor, for example, a proximity sensor on the king pin, a pair of hydraulic sensors on the fifth wheel, and a reverse sensor as non-limiting example. These three sensors could indicate when a container is engaged or disengaged. Other sensors could be monitored to determine an operator ID, collisions, fuel levels, usage statistics, and maintenance information that can be used to improve operational efficiency.

In the different systems for processing containers through the marine terminal, the real-time location system 10 tracks the location of containers continuously, such that the containers can be found more easily.

Figure 2:
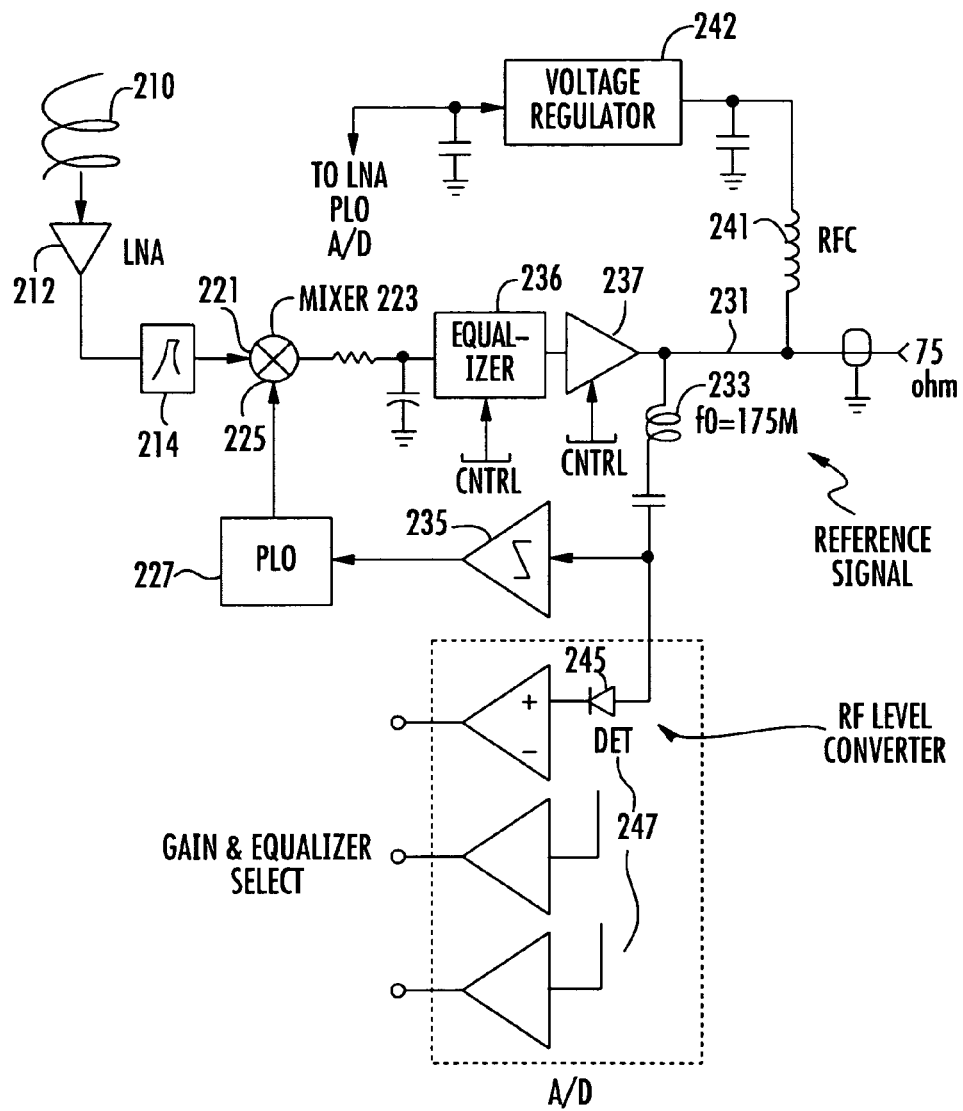
FIG. 2 is a high-level block diagram of one example of circuit architecture that can be used for a locating access point.
Figure 3:
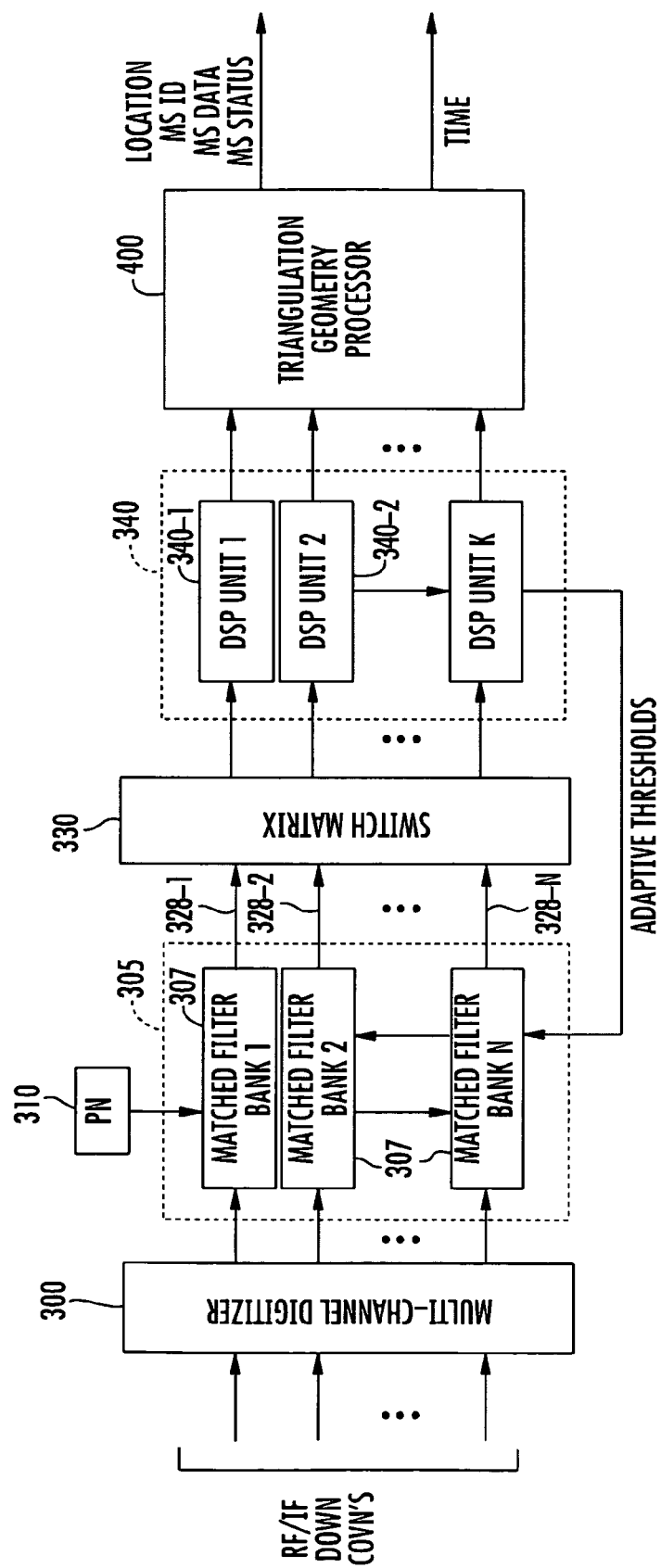
FIG. 3 is another high-level block diagram of one example of circuit architecture that can be used for a correlation-based, RF signal location processor.

FIGS. 2 and 3 represent examples of the type of circuits that can be used with modifications as suggested by those skilled in the art for locating access point circuitry and location processor circuitry as part of a server or separate unit to determine any timing matters, set up a correlation algorithm responsive to any timing matters, and determine which tag signals are first-to-arrive signals and conduct differentiation of first-to-arrive signals to locate a tag or other transmitter generating a tag or comparable signal.

Referring now to FIGS. 2 and 3, a representative circuit and algorithm as described in the above mentioned and incorporated by reference patents are disclosed and set forth in the description below to aid in understanding the type of access point and location processor circuitry that can be used for determining which signals are first-to-arrive signals and how a processor conducts differentiation of the first-to-arrive signals to locate a tag transmitter.

FIG. 2 diagrammatically illustrates one type of circuitry configuration of a respective architecture for "reading" associated signals or a pulse (a "blink") used for location determination signals, such as signals emitted from a tag transmitter to a locating access point. An antenna 210 senses appended transmission bursts or other signals from the object and tag transmitter to be located. The antenna in this aspect of the invention could be omnidirectional and circularly polarized, and coupled to a power amplifier 212, whose output is filtered by a bandpass filter 214. Naturally, dual diversity antennae could be used or a single antenna. Respective I and Q channels of a bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor. The communication cable 231 also supplies DC power for the various components of the access point by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

FIG. 3 diagrammatically illustrates the architecture of a correlation-based, RE signal processor circuit as part of a location processor to which the output of a respective RF/IF conversion circuit of FIG. 2 can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each access point can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 3, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a database where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor could be modified to include a front-end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front-end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

There now follows a description of the location optimization algorithm that can be used with the systems as described in accordance with a non-limiting example of the present invention.

In accordance with one non-limiting embodiment of the location optimization algorithm using a rule-based matching algorithm, an event trigger is generated by a mobile asset or from a fixed location to indicate the gain or loss of another asset. The system and method uses the location optimization algorithm to determine automatically the asset transaction associated with the event trigger to a very high accuracy. Certain examples could include a front end loader (FEL) that picks-up a container among an inventory of many possibilities, or a rental car lot exit lane detecting the presence of a vehicle for automated check-out from a large inventory of possibilities. The location optimization algorithm determines data from relevant real-time, tracked, assets to determine a correct association.

Figure 4:
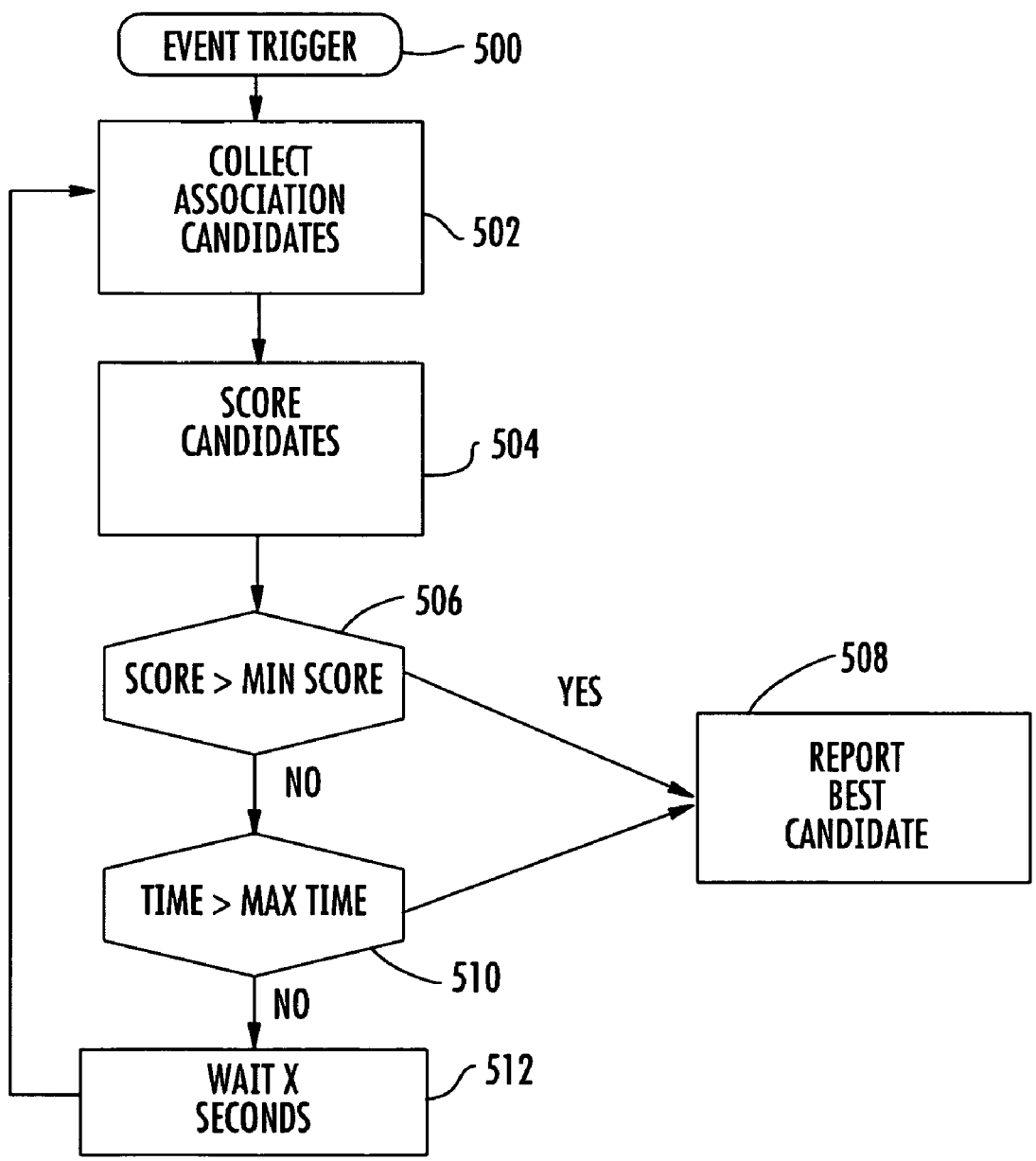
FIG. 4 is a high-level block diagram showing a process used in the system and method, in accordance with one non-limiting aspect of the present invention.

A high-level block diagram illustrating a flow sequence for the system and method is shown in FIG. 4. The process starts at an event trigger (block 500). All possible association candidates are collected (block 502). A numerical score is assigned to each candidate based on how well it matches the event according to a set of rules (block 504). A determination is made whether the score is above a minimum score (block 506). This is an optimization to report quickly a candidate if it looks good rather than waiting for a maximum time. If the score is above a minimal score, a report of the best candidate is performed (block 508), and the winning candidate is reported. If the score is not above a minimum score, a determination is made whether the time is above a maximum time (block 510). If yes, the report for the best candidate is accomplished (block 508). If the time is not above a maximum time and no solution is found, the system waits "X" amount of seconds (block 512) and goes to block 502 and the system waits for more information to arrive to collect association candidates.

Each candidate can be scored for how well it matches the event. For example, the $$\text{Total Score} = \sum_{RULES}$$

Weight$_{Rule}$ Score (Rule, Candidate). The weight is a value between 0 and 1 and indicates the importance of this rule relative to other rules. The sum of the weights of all rules typically should be 1.0. The score (rule, candidate) typically is a number normalized between −10 and 10. The negative 10 signifies that this candidate is highly inconsistent with this event based on this rule. The positive 10 indicates that this candidate is highly consistent with this event based on this rule.

A rule can be written to score a candidate for consistency with a specific point of information. For example, sources of information in a marine terminal or car rental agency could include location, timing, telemetry, database state, sensors, directional bearing such as from a compass, and other sources of information. Some of the rules that can be used to evaluate a candidate include a proximity rule, which is a distance am (associate) candidate was located from an event trigger at the time of process initiation. A moving rule is where the candidate was stopped or moving at the time of the event trigger. Data can come from motion sensors and/or a location trail. A bearing rule includes a heading direction for both the event trigger asset and a candidate asset. Data can come from a compass, inertial navigation sensors and/or location trails. Inclusion sensors can refer to other candidate sensor's data inclusion for consistency with an event. Exclusion sensors on the AC or other tracked assets could exclude the possibility of the candidate being valid. An asset type allows consistency of the traced asset in a database (DB) associated with the candidate.

Concerning the event trigger, typically there has been no real-time way to capture an event if this fails. It could be over determined (multiple sources) to improve reliability. Candidate data over-determination allows correct transaction recording, even in the event of erroneous data elements. The location optimization algorithm can alert for a data element error source such as a broken sensor, or similar problems either instantaneously or based on an accumulated history of results. The location optimization algorithm is operative with an engine as part of the system and typically can automatically adjust weighting for known data element errors.

There are various benefits of the system as described. The system can consider all possible candidates and can determine a solution with low latency if a candidate has a sufficiently high score. The system can handle inconsistent and over-determined datasets, and can choose not to report a solution if all candidate scores are lower than desirable. The confidence level can readily be determined and reported based on the score. The system can take into account many kinds of information including location, telemetry, database, timing, sensors, and similar information sources. The algorithm can be readily extended by adding new rules and adjusting weights.

Figure 5:
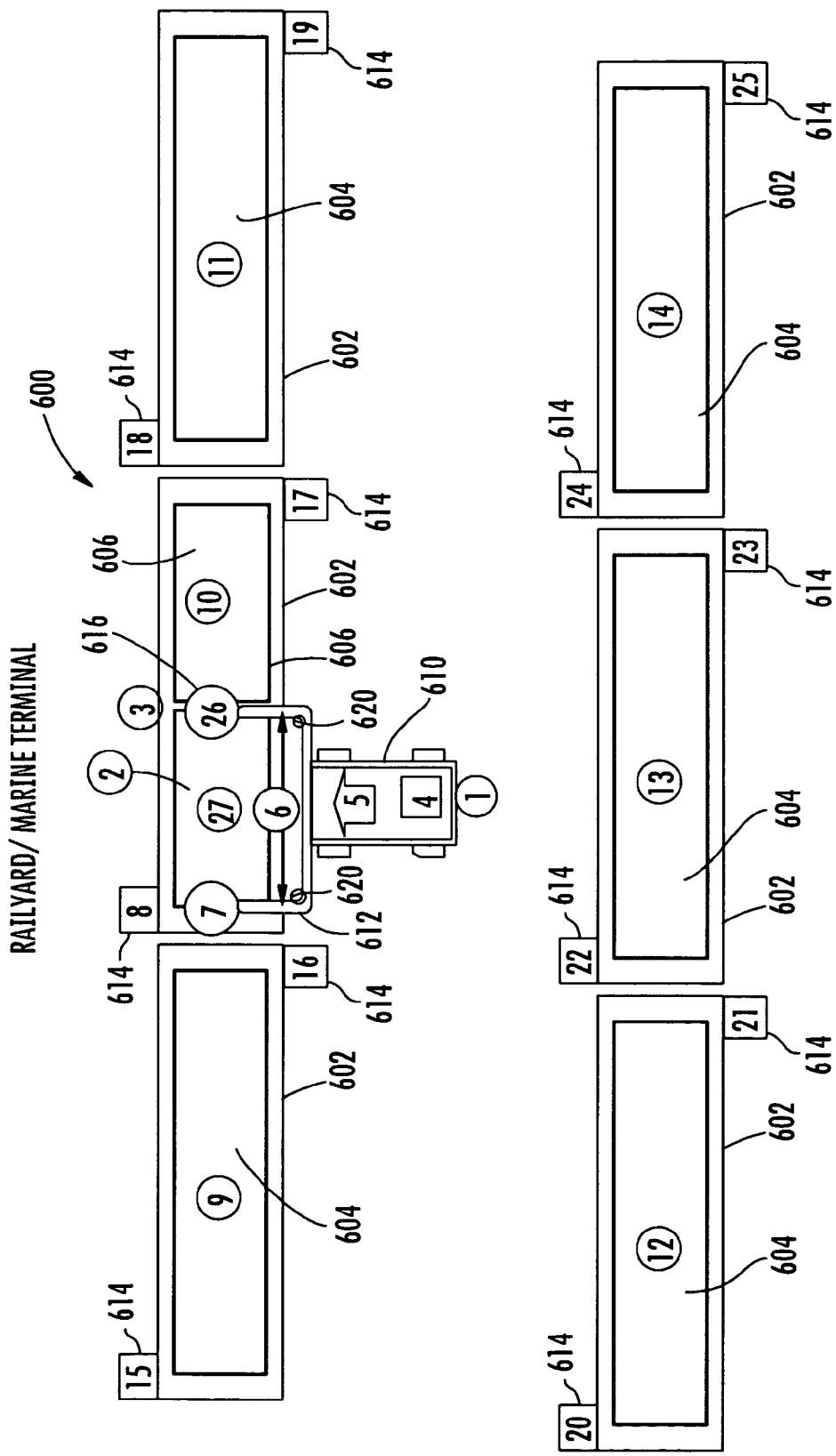
FIG. 5 is a block diagram showing an event layout description for cargo containers placed on railcars such as at a marine terminal.
Figure 6:
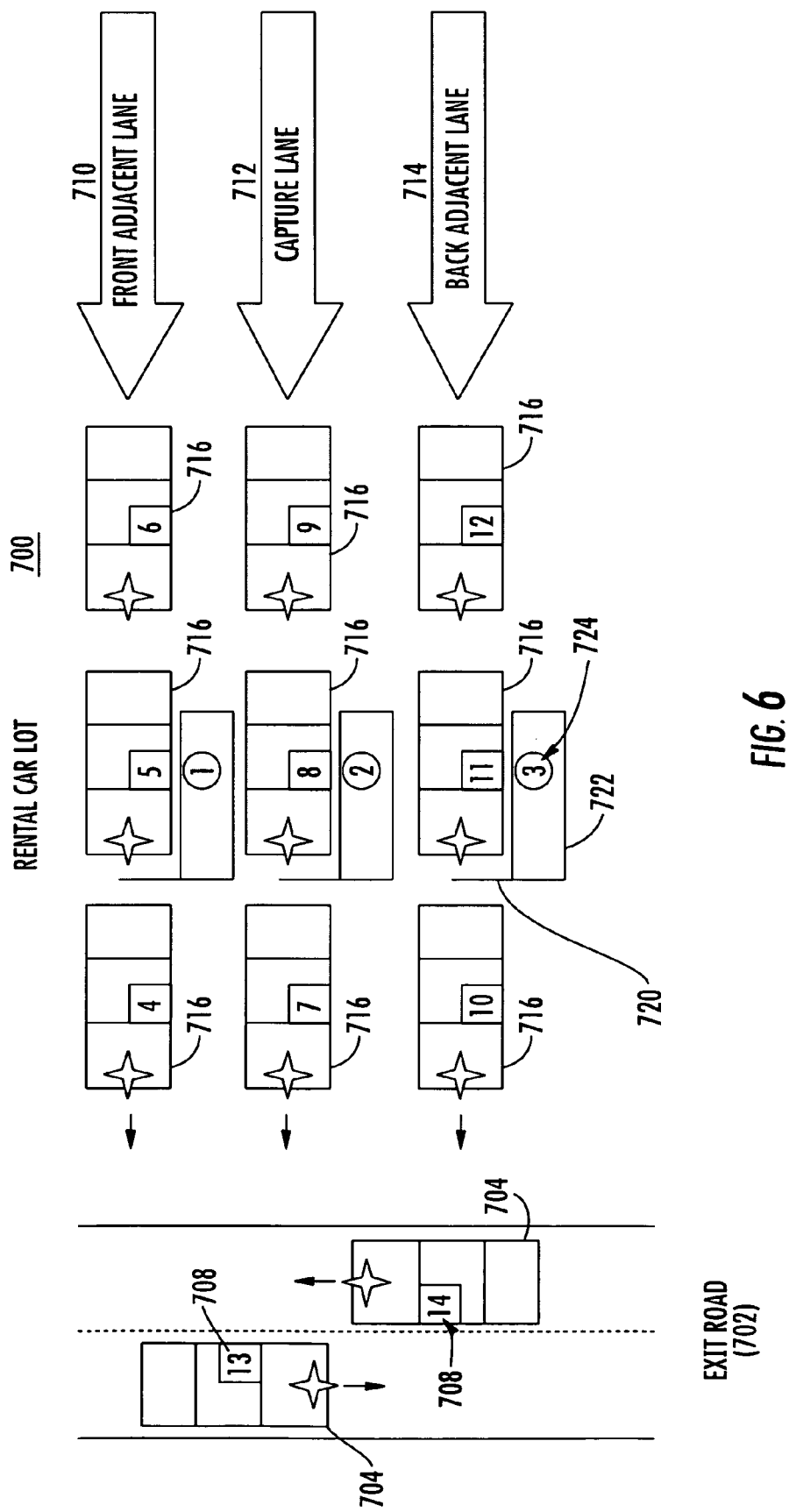
FIG. 6 is a block diagram showing detailed events for a rental car location.

Examples of the location optimization system and related method are shown with respect to FIGS. 5 and 6. FIG. 5 shows an example of the system at 600, the rail cars at 602, and ISO containers loaded on a railcar, such as at a marine terminal as described above. This example includes a 40-foot ISO container 604 on a rail car 602 and two 20-foot ISO containers 606 on another rail car as illustrated. A front-end loader (FEL) 610 includes a spreader 612. Tag transmitters 614 are located on the containers 604, 606. An interrogator 616 as a Whereport device is attached to each arm of the spreader 612. Sensors 620 can be positioned on the spreader arms also.

The tables below show the detailed event layout description and associate candidate selection rules with reference to the numbers on FIG. 5.

I. ISO Marine Containers on Rail Cars

| EVENT DESCRIPTION | A FRONT END LOADER (FEL) REMOVING MARINE ISO CONTAINERS FROM A FLAT-BED RAILCAR |
|---|---|
| EVENT DATA REQUIREMENT | ASSOCIATE FEL WITH CORRECT CONTAINER |

| DETAILED EVENT LAYOUT DESCRIPTION | | |
|---|---|---|
| ELEMENT | DESCRIPTION | DRAWING REFERENCE NUMBER(S) |
| PRIMARY ASSET | FEL | 1 |
| DEPENDANT ASSET | 20' ISO CONTAINER - LEFT | 2 |
| AUXILLARY ASSET | RAIL CAR | 3 |
| PRIMARY SENSOR ELEMENTS | *LOCATION TAG ON FEL | 4 |
| | *COMPASS ON FEL | 5 |
| | *SPREADER WIDTH AND CONTAINER CONNECTION SENSOR | 6 |
| | *WHEREPORTS ON FEL SPREADER - 25' RANGE | 7, 26 |
| | *TAGS ON RAILCARS | 8, 15:25 |
| ASSOCIATE CANDIDATES | ALL CONTAINERS | 2, 9:14 |

| ASSOCIATE CANDIDATE SELECTION RULES | | |
|---|---|---|
| RULE TYPE | DATA SOURCE | DRAWING REFERENCE NUMBER(S) |
| EVENT TRIGGER | CONTAINER CONNECTION TELEMETRY FROM SPREADER SENSOR | 6 |
| PROXIMITY | *DISTANCE BETWEEN FEL LOCATION TAG AND RAILCAR | 4 TO 8 & 15:25 |

|                | -continued |              |
|----------------|------------|--------------|
|                | LOCATION TAGS | |
|                | *TAGS STOPPED | 4, 8, 15:25 |
| BEARING        | *FEL COMPASS TELEMETRY | 5 |
| DATA INCLUSION | *FEL WHEREPORTS TRIGGER RESPONSES FROM RAIL CAR LOCATION TAGS UP TO 25' DISTANT | 7 TO (8, 16) & 26 TO (17, 18) |
|                | *WHEREPORTS TRIGGER A RESPONSE FROM BOTH LOCATION TAGS OF SAME RAIL CAR | 7 TO 8, 26 TO 17 |
| DATA EXCLUSION | *NO WHEREPORT TRIGGER RESPONSES FROM HOST RAILCAR TAGS | 7 & 26, 20:25 |
| ASSET TYPE     | *DATA BASE CONFIRMS 20' CONTAINER TYPE | 2 |

For the associate candidate selection at proximity, the system is indicative of the relative location of all candidate false FEL event triggers and/or the lower train moving past an event. As to the bearing, the FEL is not pointed toward the lower train and not coming from the top side of upper train. Left or right pointing indicates a false event trigger.

each having cars 716 and tags 718. An exit gate 720, an exit kiosk 722, and lane sensor 724 are illustrated.

The chart below indicates the event description and the automatic identification of rental cars at a lot.

II. Rental Car

| EVENT DESCRIPTION | AUTOMATIC IDENTIFICATION OF RENTAL CARS AT LOT |
|---|---|
| EVENT DATA REQUIREMENT | REAL-TIME ID OF CAR |

| DETAILED EVENT LAYOUT DESCRIPTION (FIG. 6) | | |
|---|---|---|
| ELEMENT | DESCRIPTION | DRAWING REFERENCE NUMBER'S |
| PRIMARY ASSET | EXIT KIOSK | 2 |
| DEPENDANT ASSET | RENTAL CAR IN THE EXIT POSITION AT THE KIOSK | 8 |
| AUXILLARY ASSET | NONE | |
| PRIMARY SENSOR | LANE SENSORS | 1, 2, 3 |
| ASSOCIATE CANDIDATES | ALL RENTAL CARS IN THE AREA | 4 TO 14 |

| ASSOCIATE CANDIDATE SELECTION RULES | | |
|---|---|---|
| RULE TYPE | DATA SOURCES | DRAWING REFERENCE NUMBER'S |
| EVENT TRIGGER (PREFERRED) | GUARD (KEY STROKE) OR DRIVER (CARD SWIPE) | 2 |
| EVENT TRIGGER (NO-TOUCH) | A SINGLE AUTO-TAG BLINK DETECTION AT THE EXIT | 2 |
| PROXIMITY | NUMBER OF AUTO-TAG BLINKS DETECTED | (1, 2, 3) & (4 TO 14) |
| BEARING | N/A | |
| DATA INCLUSION | ALL AUTO-TAGS DETECTED AT ALL EXIT LANE SENSORS | |
| DATA EXCLUSION | ALL TAGS DETECTED THAT ARE IN-RENTAL (CHECKED OUT) | 4, 7, 10, 13, 14 |
| ASSET TYPE | DATA BASE RECORD OF VEHICLES AVAILABLE FOR RENTAL | |

FIG. 6 shows a rental car lot example. The rental lot 700 includes an exit road 702 with two cars 704 and tags 708 positioned on the cars. The drawing also shows a front adjacent lane 710, a capture lane 712 and a back adjacent lane 714, For the proximity category with the associate candidate selection rules, there is a 10' detect capture range to a 30' release (ducting) range.

It should be understood that it is not always necessary to report the first information source because the events occur over time and more information is coming into the system. The algorithm can work in real-time. Typically, more information can arrive before scoring and there is a threshold score. If none of the candidates reach a threshold, then it is possible to wait for more information to arrive before scoring.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A system for associating a change in a state or location of an asset to an event trigger within a monitored environment, comprising:
   a plurality of assets;
   a tag transmitter positioned on each asset and configured to transmit a wireless RF signal based on an event trigger based on one of at least the change in the state of the asset on which the tag transmitter is positioned and the change in the location of the asset;
   a plurality of spaced apart access points positioned at known locations within the monitored environment and configured to receive the wireless RF signal transmitted from the tag transmitter; and
   a processor operatively connected to said access points, wherein said processor is configured to collect possible candidates as assets associated with the event trigger and configured to assign a numerical score to each candidate to determine which asset is best associated with the event trigger, wherein the numerical score of each candidate is based upon how well each candidate matches an event associated with the event trigger according to at least one rule configured to assess each candidate with the event.

2. The system according to claim 1, and further comprising at least one sensor within the monitored environment, wherein the sensor is operative with the tag transmitter, wherein the sensor is configured to sense the event associated with the event trigger, and wherein the sensor is configured to transmit data to one of at least the tag transmitter positioned on one of the plurality of assets and one of the plurality of access points.

3. The system according to claim 2, and further comprising an interrogator positioned within the monitored environment, wherein the interrogator is configured to interrogate the tag transmitter positioned on one of the plurality of assets to begin transmission.

4. The system according to claim 1, wherein said monitored environment comprises a rental car lot, wherein said assets comprise a plurality of rental cars, wherein the event trigger is the presence of at least one of the rental cars in an exit lane of the rental car lot, and wherein the processor is configured to determine which rental car is best associated with being present in the exit lane.

5. The system according to claim 1, wherein said monitored environment comprises a cargo container terminal, wherein said assets comprise at least one of a cargo container and a container handling equipment, wherein the event trigger is the passage of the cargo container or container handling equipment through a port device field of a terminal port, and wherein the processor is configured to determine which cargo container or container handling equipment is best associated with passing through the terminal port.

6. The system according to claim 1, wherein said monitored environment comprises a marine terminal, wherein said assets comprise a plurality of cargo containers, wherein the event trigger is one of a crane picking a container off a ship or the crane dropping the container onto a truck or a rail car, and wherein the processor is configured to determine which cargo container is best associated with being picked off the ship or dropped onto the truck or rail car.

7. The system according to claim 1, wherein said processor is configured to geolocate a tag transmitter.

8. The system according to claim 7, wherein said processor is configured to correlate a signal as a first-to-arrive signal and configured to conduct differentiation of first-to-arrive signals.

9. The system according to claim 1, wherein said processor is configured to report the candidate associated with the event trigger when its numerical score is above a predetermined minimum numerical score.

10. The system according to claim 9, wherein said processor is configured to report the candidate associated with the event trigger that has the highest numerical score.

11. The system according to claim 10, wherein said processor is configured to wait a predetermined time if the numerical score is not above the minimum numerical score and configured to report the candidate associated with the event trigger having the best numerical score below the minimum numerical score.

12. The system of claim 1, wherein the numerical score of each candidate is based upon how well each candidate matches the event associated with the event trigger according to at least two rules of a rule set, wherein each rule is configured to assess each candidate with the event, and wherein at least one rule of the rule set is weighed differently than another rule of the rule set.

13. A system for associating a change in a state or location of a cargo container to an event trigger within a cargo container terminal, comprising:
   a plurality of cargo containers;
   a tag transmitter positioned on each cargo container and configured to transmit a wireless RF signal based on an event trigger based on one of at least the change in the state of the cargo container on which the tag transmitter is positioned and the change in the location of the cargo container within the terminal;
   a plurality of spaced apart access points positioned at known locations within the terminal and configured to receive the wireless RF signal transmitted from the tag transmitter; and
   a processor operatively connected to said access points wherein said processor is configured to collect possible candidates as cargo containers associated with the event trigger and configured to assign a numerical score to each candidate to determine which cargo container is best associated with the event trigger, wherein the numerical score of each candidate is based upon how well each candidate matches an event associated with the event trigger according to at least one rule configured to assess each candidate with the event.

14. The system according to claim 13, and further comprising at least one sensor within the terminal, wherein the sensor is operative with the tag transmitter, wherein the sensor is configured to sense the event associated with the event trigger, and wherein the sensor is configured to transmit data to one of at least the tag transmitter positioned on one of the plurality of cargo containers and one of the plurality of access points.

15. The system according to claim 14, and further comprising container handling equipment on which said sensor is mounted.

16. The system according to claim 13, and further comprising an interrogator positioned at the terminal, wherein the interrogator is configured to interrogate the tag transmitter positioned on one of the plurality of cargo containers to begin transmission.

17. The system according to claim 13, wherein said processor is configured to geolocate the tag transmitter positioned on one of the plurality of cargo containers.

18. The system according to claim 17, wherein said processor is configured to correlate a signal as a first-to-arrive signal and configured to conduct differentiation of first-to-arrive signals.

19. A method for associating a change in a state or location of an asset to an event trigger in a monitored environment having a plurality of assets to be tracked, wherein a tag transmitter positioned on each asset to be tracked is configured to transmit a wireless RF signal based upon the event trigger, wherein a plurality of spaced apart access points positioned at known locations within the monitored environment are configured to receive the wireless RF signal transmitted from the tag transmitter, and wherein a processor is operatively connected to said access points, the method comprising:
generating an event trigger based on one of at least the change in the state of the asset and the change in the location of the asset to indicate the gain or loss of the asset within the monitored environment;
collecting, by the processor, possible candidates as assets associated with the event trigger; and
assigning, by the processor, a numerical score to each candidate to determine which asset is best associated with the event trigger, wherein the numerical score of each candidate is based upon how well each candidate matches an event associated with the event trigger according to at least one rule configured to assess each candidate with the event.

20. The method according to claim 19, wherein the event trigger comprises a loader picking up a container among a plurality of containers.

21. The method according to claim 19, wherein the event trigger comprises the detection of the presence of a vehicle in an exit lane of a rental car lot for automated check-out.

22. The method according to claim 19, further comprising generating the event trigger from a fixed location when the asset is moved.

23. The method according to claim 19, further comprising generating the event trigger from a cargo container terminal, wherein the event trigger is the passage of a cargo container through a port of the cargo container terminal.

24. The method according to claim 19, further comprising reporting the candidate associated with the event trigger when its numerical score is above a predetermined minimum numerical score.

25. The method according to claim 24, further comprising reporting the candidate with the event trigger that has the highest numerical score.

26. The method according to claim 25, further comprising waiting a predetermined time if the numerical score is not above the minimum numerical score and reporting the candidate associated with the event trigger having the best numerical score below the minimum numerical score.

27. The method of claim 19, wherein assigning the numerical score of each candidate is based upon how well each candidate matches the event associated with the event trigger according to at least two rules of a rule set, wherein each rule is configured to assess each candidate with the event, and wherein at least one rule of the rule set is weighed differently than another rule of the rule set.

* * * * *

UNITED STATES PATENT AND TRADEMARK OFFICE
CERTIFICATE OF CORRECTION

| | | |
|---|---|---|
| PATENT NO. | : 7,916,023 B2 | Page 1 of 1 |
| APPLICATION NO. | : 11/624848 | |
| DATED | : March 29, 2011 | |
| INVENTOR(S) | : Rado | |

It is certified that error appears in the above-identified patent and that said Letters Patent is hereby corrected as shown below:

Column 7,
Line 41, "RE signal" should read --RF signal--.

Column 9,
Line 30, "Bach" should read --Each--.

Signed and Sealed this
Sixth Day of March, 2012

David J. Kappos
*Director of the United States Patent and Trademark Office*